(12) United States Patent
Danielsson et al.

(10) Patent No.: US 12,137,131 B2
(45) Date of Patent: Nov. 5, 2024

(54) USER EQUIPMENT AND MEDIA STREAMING NETWORK ASSISTANCE NODE

(71) Applicant: Sony Group Corporation, Tokyo (JP)

(72) Inventors: Martin Danielsson, Lund (SE); Peter C. Karlsson, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 50 days.

(21) Appl. No.: 17/476,553

(22) Filed: Sep. 16, 2021

(65) Prior Publication Data

US 2022/0006847 A1 Jan. 6, 2022

Related U.S. Application Data

(63) Continuation of application No. 14/868,614, filed on Sep. 29, 2015, now Pat. No. 11,153,359.

(51) Int. Cl.
*H04L 65/60* (2022.01)
*H04L 49/90* (2022.01)
(Continued)

(52) U.S. Cl.
CPC .............. *H04L 65/60* (2013.01); *H04L 49/90* (2013.01); *H04L 65/61* (2022.05); *H04L 65/80* (2013.01); *H04L 67/1097* (2013.01); *H04N 21/2401* (2013.01); *H04N 21/2402* (2013.01); *H04N 21/2407* (2013.01); *H04N 21/251* (2013.01); *H04N 21/25808* (2013.01); *H04N 21/44209* (2013.01); *H04N 21/6131* (2013.01); *H04N 21/6181* (2013.01); *H04N 21/6582* (2013.01);
(Continued)

(58) Field of Classification Search
CPC . H04L 65/4092; H04L 65/60; H04L 67/2842; H04L 67/2847; H04L 67/306; H04N 21/64738
See application file for complete search history.

(56) References Cited

U.S. PATENT DOCUMENTS 6,928,603 B1 * 8/2005 Castagna .............. H03M 13/35
714/786
11,153,359 B2 10/2021 Danielsson
(Continued)

FOREIGN PATENT DOCUMENTS

| EP | 1745609 B1 | 1/2007 |
| JP | 2014218589 A | 11/2014 |

(Continued)

OTHER PUBLICATIONS

Falik, Y. et al., "Transmission Algorithm for Video Streaming Over Cellular Networks", Wireless Networks, 16:1459-1475, Sep. 29, 2009, pp. 1459-1475.
(Continued)

*Primary Examiner* — Barbara B Anyan
(74) *Attorney, Agent, or Firm* — Tucker Ellis LLP

(57) ABSTRACT

A user equipment includes a wireless interface for communication with a cellular communication network. The user equipment is operative to receive, via the wireless interface, network assistance information for a media streaming session, and to transmit media streaming session related information to the cellular communication network.

20 Claims, 11 Drawing Sheets

(51) Int. Cl.
*H04L 65/61* (2022.01)
*H04L 65/80* (2022.01)
*H04L 67/1097* (2022.01)
*H04N 21/24* (2011.01)
*H04N 21/25* (2011.01)
*H04N 21/258* (2011.01)
*H04N 21/442* (2011.01)
*H04N 21/61* (2011.01)
*H04N 21/658* (2011.01)
*H04W 84/04* (2009.01)
*H04L 1/00* (2006.01)
*H04L 47/30* (2022.01)
*H04L 65/1101* (2022.01)
*H04L 65/75* (2022.01)
*H04L 67/025* (2022.01)

(52) U.S. Cl.
CPC ......... *H04W 84/042* (2013.01); *H04L 1/0001* (2013.01); *H04L 1/0025* (2013.01); *H04L 47/30* (2013.01); *H04L 65/1101* (2022.05); *H04L 65/765* (2022.05); *H04L 67/025* (2013.01)

(56) References Cited

U.S. PATENT DOCUMENTS

| | | | | |
|---|---|---|---|---|
| 2001/0044751 | A1* | 11/2001 | Pugliese, III | G06Q 30/02 705/14.1 |
| 2005/0091311 | A1* | 4/2005 | Lund | G08B 13/19656 709/203 |
| 2005/0185733 | A1* | 8/2005 | Tolli | H04L 1/0025 375/285 |
| 2007/0258418 | A1 | 11/2007 | Wurtenberger et al. | |
| 2008/0256272 | A1* | 10/2008 | Kampmann | H04L 29/06027 710/57 |
| 2009/0028047 | A1* | 1/2009 | Schmidt | G08C 17/02 370/235 |
| 2013/0097309 | A1* | 4/2013 | Ma | H04L 29/08099 709/224 |
| 2014/0337093 | A1* | 11/2014 | Jain | G06Q 30/0201 705/7.29 |
| 2015/0036582 | A1* | 2/2015 | Majidi-Ahy | H04L 1/0001 370/312 |
| 2015/0036663 | A1* | 2/2015 | Kilpatrick, II | H04W 36/245 370/332 |
| 2015/0350276 | A1 | 12/2015 | Karlsson et al. | |
| 2016/0088527 | A1* | 3/2016 | Wolff | H04W 36/0055 455/436 |
| 2016/0105728 | A1* | 4/2016 | Schmidmer | H04N 21/44008 725/110 |

FOREIGN PATENT DOCUMENTS

| | | |
|---|---|---|
| JP | 2015161566 A | 9/2015 |
| JP | 6605132 B2 | 11/2019 |
| KR | 20070010200 A | 1/2007 |
| WO | 2014096463 A1 | 6/2014 |

OTHER PUBLICATIONS

Schulzrinne, H. et al., "Real Time Streaming Protocol (RTSP)", Apr. 1998.

Intel, Sony Mobile Communications, Telecom Italia S.p.A., "Mobile-Edge Computing Enhancements for 3GPP Multimedia Services", Jul. 10, 2015, 6 pages.

* cited by examiner

USER EQUIPMENT AND MEDIA STREAMING NETWORK ASSISTANCE NODE

FIELD OF THE INVENTION

Embodiments of the invention relate to wireless communication. Embodiments of the invention relate in particular to techniques in which network assistance information assists a user equipment in a media streaming session.

BACKGROUND OF THE INVENTION

With increasing popularity of mobile voice and data communication, there is an ever increasing demand for high-speed data communication. User equipment operative to connect to a communication network, e.g. smartphones or portable computers, have advanced processing capabilities. Many users consider the capability of retrieving a video in a video streaming session to be significant benefit of the user equipment. Long delays in the playback process performed at the user equipment in a video streaming session may lead to frustration and are not satisfactory in view of the technical expectations of many users. Such delays or other factors that negatively affect Quality of Experience (QoE) may be caused by buffering strategies or other streaming algorithms that are not particularly suitable for the video streaming session that is being performed to stream a video to the user equipment.

In a video streaming session, a user equipment may be connected to a streaming media content server connected to a wide area network, such as the internet, via a cellular radio access network. The video streaming protocol may provide an end-to-end connectivity protocol between the user equipment and the content server. This end-to-end communication may use an adaptive bit rate (ABR) protocol, e.g. MPEG DASH. Within this protocol the user equipment is requested to dynamically select the video quality for each downloaded video segment, matching the varying data rate available in the end to end communication link. A significant part of these variations may come from dynamic aspects in the radio access network. The radio access network might be a cellular network, a Wi-Fi access network or any other wireless network. A legacy implementation of a network assistance protocol may aid a user equipment in selecting suitable data rates. With such a network assistance protocol, the radio access network may share information collected by the radio access network to assist the user equipment in the process of identifying suitable media data rates that match current radio access network conditions.

Conventional network assistance for video streaming has various shortcomings. For illustration, the network assistance is based on characteristics determined by radio access network (RAN) nodes. The network assistance that can be provided based on such information may be of limited value to assist in setting parameters in the user equipment for a video streaming session.

BRIEF SUMMARY OF THE INVENTION

There is a continued need in the art for devices, systems and methods to assist a user equipment in setting parameters for a media streaming session. There is in particular a need for devices, systems and methods in which the user equipment can be provided with assistance which is not only based on measurements performed in the radio access network.

According to embodiments, a user equipment generates media streaming session related information based on characteristics monitored in a media streaming session. A media streaming network assistance node may store and optionally process the media session related information provided by the user equipment. The media streaming network assistance node may use the media session related information provided by the user equipment and, optionally, other user equipments to provide network assistance in subsequent media streaming sessions.

The media streaming session related information may include information relating to suitable buffer strategies, e.g. minimum, maximum or average buffer levels of a user equipment in a media streaming session. The media streaming network assistance node may use this information to provide network assistance which allows the user equipment which provided the media streaming session related information or at least one other user equipment to set suitable parameters for buffering. One example for such a parameter is the buffer level which must be reached before media outputting at an optical output unit of the user equipment is started.

The media streaming session related information may include information relating to suitable streaming algorithm parameters, e.g. a Quality of Experience (QoE) in the media streaming session and the associated media quality. The media streaming network assistance node may use this information to provide network assistance which allows the user equipment which provided the media streaming session related information or at least one other user equipment to set a suitable initial media quality. For illustration, medias may be available in at least two different quality levels which may correspond to different image resolutions, and the network assistance may be capable of using media streaming session related information reported by user equipments to assist in identifying the most suitable media quality from among the at least two different quality levels.

As will be explained in more detail below, various embodiments are operative to implement the collection of media streaming session related information by a media streaming network assistance node. The media streaming network assistance node may provide assistance information which may, at least inter alia, be based on the media streaming session related information reported by user equipments in earlier media streaming sessions. The assistance provided thereby may allow the user equipment to select suitable or even optimum parameter values for buffering strategies, media quality selection or other streaming algorithm parameters.

A user equipment according to an embodiment comprises a wireless interface for communication with a radio access network in a media streaming session. The user equipment is operative to receive, via the wireless interface, network assistance information for execution of the media streaming session. The user equipment is operative to generate media streaming session related information from characteristics monitored during the media streaming session, and transmit the media streaming session related information over the wireless interface to the radio access network for storage.

A user equipment having such a configuration transmits, in operation, media streaming session related information to a node for storage, which allows the node to generate network assistance information based on characteristics monitored by user equipments.

The user equipment may be operative to generate a storage request including the media streaming session related information. The storage request may cause storage of the media streaming session related information in a storage medium remote from the user equipment.

The storage medium may be comprised by a media streaming network assistance node, which may be implemented as a base station or other radio access network node or as a separate node having information sharing connection to one or more radio access network nodes.

The storage request may cause a cellular network node of the cellular communication network or of another radio access network to store the media streaming session related information. Mobile edge computing, MEC, may be used in a base station, e.g. an eNodeB, or in another radio access network node or a separate node having information sharing connection to one or more radio access network nodes to provide network assistance with only short processing delays.

The user equipment may be operative to generate the media streaming session related information based on time-dependent changes of a buffer level during buffering in the media streaming session.

The user equipment may be operative to generate the media streaming session related information based on buffer levels monitored during the media streaming session and/or information relating to suitable media quality settings for the media streaming session.

The user equipment may be operative to generate the media streaming session related information based on a maximum buffer level of the user equipment in the media streaming session.

Alternatively or additionally, the user equipment may be operative to generate the media streaming session related information based on a minimum buffer level of the user equipment in the media streaming session.

Alternatively or additionally, the user equipment may be operative to generate the media streaming session related information based on an average buffer level of the user equipment in the media streaming session.

Alternatively or additionally, the user equipment may be operative to generate the media streaming session related information based on a time between user equipment initiated buffer refills.

Alternatively or additionally, the user equipment may be operative to generate the media streaming session related information based on a number of segments per buffer refill.

Alternatively or additionally, the user equipment may be operative to generate the media streaming session related information based on a number of buffer underruns.

Alternatively or additionally, the user equipment may be operative to generate the media streaming session related information based on durations of each buffer underrun.

Alternatively or additionally, the user equipment may be operative to generate the media streaming session related information based on a quality of experience indicator in the media streaming session.

Alternatively or additionally, the user equipment may be operative to generate the media streaming session related information based on an identifier for the user equipment and/or an identifier for an application module of the user equipment which requires the network assistance information.

The network assistance information received by the user equipment may be based on information associated with a previous media streaming session reported by the user equipment and/or information associated with the previous media streaming session reported by at least one further user equipment different from the user equipment. Information from one or several user equipments may be aggregated by a media streaming network assistance node, may be processed further, and used by the user equipment to identify suitable settings for a media streaming session by means of network assistance.

The user equipment being operative to set at least one parameter of a streaming algorithm executed by the may be equipment during the media streaming session based on the network assistance information received by the user equipment.

Alternatively or additionally, the user equipment may be operative to set buffering parameters of a buffering performed in the media streaming session based on the network assistance information received by the user equipment.

Alternatively or additionally, the user equipment may be operative to set an initial media quality of the media streaming session based on the network assistance information received by the user equipment.

The user equipment may be operative to transmit, via the wireless interface, a network assistance request to obtain network assistance based on information collected by a media streaming network assistance node from at least one further user equipment during previous media streaming sessions.

A media streaming network assistance node according to an embodiment comprises at least one processor to generate network assistance information associated with a media streaming session for a user equipment. The media streaming network assistance node comprises an interface to receive media streaming session related information from the user equipment. The media streaming network assistance node comprises a storage medium to store the media streaming session related information received from the user equipment. The least one processor may be operative to use the media streaming session related information received from the user equipment to provide network assistance information for media streaming.

A media streaming network assistance node having such a configuration receives, in operation, media streaming session related information from one or several user equipments, which allows the media streaming network assistance node to generate network assistance information based on characteristics monitored by user equipments.

The at least one processor of the media streaming network assistance node may be operative to derive statistical information from the media streaming session related information of a user equipment and further media streaming session related information received from a plurality of further user equipments.

The media streaming session related information may include information on a time-dependent change of a buffer level in buffering performed by the user equipment during the media streaming session.

The at least one processor of the media streaming network assistance node may be operative to retrieve, from the media streaming session related information, a maximum buffer level of the user equipment in the media streaming session to provide network assistance for buffering.

Alternatively or additionally, the at least one processor of the media streaming network assistance node may be operative to retrieve, from the media streaming session related information, a minimum buffer level of the user equipment in the media streaming session to provide network assistance for buffering.

Alternatively or additionally, the at least one processor of the media streaming network assistance node may be operative to retrieve, from the media streaming session related information, an average buffer level of the user equipment in the media streaming session to provide network assistance for buffering.

Alternatively or additionally, the at least one processor of the media streaming network assistance node may be operative to retrieve, from the media streaming session related information, a time between user equipment initiated buffer refills in the media streaming session to provide network assistance for buffering.

Alternatively or additionally, the at least one processor of the media streaming network assistance node may be operative to retrieve, from the media streaming session related information, a number of segments per buffer refill in the media streaming session to provide network assistance for buffering.

Alternatively or additionally, the at least one processor of the media streaming network assistance node may be operative to retrieve, from the media streaming session related information, a number of buffer underruns in the media streaming session to provide network assistance for buffering.

Alternatively or additionally, the at least one processor of the media streaming network assistance node may be operative to retrieve, from the media streaming session related information, a duration of buffer underruns in the media streaming session to provide network assistance for buffering.

Alternatively or additionally, the at least one processor of the media streaming network assistance node may be operative to retrieve, from the media streaming session related information, a quality of experience indicator in the media streaming session to provide network assistance for selecting an appropriate initial media quality.

The at least one processor of the media streaming network assistance node may be operative to derive statistical information by processing the media streaming session related information and further media streaming session related information received from further user equipments. Characteristics monitored by plural user equipments may thereby be taken into account for the provision of network assistance.

The media streaming network assistance node may provide network assistance information which affects a buffering procedure performed by the user equipment in the media streaming session.

Alternatively or additionally, the media streaming network assistance node may provide network assistance information which affects an initial media quality selection of the user equipment in the media streaming session.

The media streaming network assistance node may be a base station of a cellular communication network, may be integrated in the base station or may be directly or indirectly coupled to the base station. The base station may be an eNodeB.

The media streaming network assistance node may be operative to generate the network assistance information by means of mobile-edge-computing, MEC. Delays in the provision of the network assistance may thereby be reduced.

The media streaming network assistance node may comprise a further interface for sharing data derived from the media streaming session related information with other network nodes or other servers connected to a wide area network.

A system according to an embodiment comprises a user equipment according to an embodiment and a media streaming network assistance node according to an embodiment.

The media streaming network assistance node may be a cellular network node.

The system may further comprise a media streaming server remote from the media streaming network assistance node.

During a media streaming session, the user equipment may establish a communication link to the media streaming server, and the user equipment may establish a further communication link to the media streaming network assistance node.

A media streaming method according to an embodiment comprises requesting, by a user equipment, network assistance for a media streaming session. The method comprises receiving, by the user equipment, network assistance information. The method comprises setting, by the user equipment, at least one parameter for execution of the media streaming session as a function of the received network assistance information. The method comprises generating, by the user equipment, media streaming session related information from characteristics monitored during the media streaming session. The method comprises transmitting, by the user equipment, the media streaming session related information over the wireless interface to a radio access network for storage.

The media streaming session related information may be based on a maximum buffer level of the user equipment in the media streaming session.

Alternatively or additionally, the media streaming session related information may be based on a minimum buffer level of the user equipment in the media streaming session.

Alternatively or additionally, the media streaming session related information may be based on an average buffer level of the user equipment in the media streaming session.

Alternatively or additionally, the media streaming session related information may be based on a time between user equipment initiated buffer refills.

Alternatively or additionally, the media streaming session related information may be based on a number of segments per buffer refill.

Alternatively or additionally, the media streaming session related information may be based on a number of buffer underruns.

Alternatively or additionally, the media streaming session related information may be based on durations of each buffer underrun.

Alternatively or additionally, the media streaming session related information may be based on a quality of experience indicator in the media streaming session.

The media streaming method may further comprise using, by a media streaming network assistance node, the media streaming session related information to provide network assistance to the user equipment and/or to at least one further user equipment different from the user equipment.

The network assistance information may assist the user equipment in selecting at least one parameter of a buffering procedure and/or an initial media quality.

The method may be performed by the user equipment, the media streaming network assistance node or the system according to an embodiment.

The devices, systems and methods according to embodiments may be used in association with video streaming. In this case, the media is a video, the streaming server is a media streaming server, and the media streaming network assistance node is a media streaming network assistance node. The video may include a sequence of images and, optionally, sound.

The devices, systems and methods according to embodiments may be used in association with audio streaming. In this case, the media is an audio, the streaming server is an audio streaming server, and the media streaming network assistance node is an audio streaming network assistance node.

Devices, systems and methods according to embodiments are operative to provide a user equipment with network assistance, with the provided network assistance being based on media streaming session related information previously reported by other user equipments or the same user equipment. The devices, systems and methods according to embodiments may be used to assist a user equipment to set a buffer level up to which a buffer must be filled before playback of media is started, other buffering parameters, an initial media quality selection set by the user equipment, or other parameters of a streaming algorithm executed by the user equipment.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Exemplary embodiments of the invention will be described with reference to the drawings. While some embodiments will be described in the context of specific fields of application, e.g. in the context of exemplary radio access technologies, the embodiments are not limited to this field of application. The features of the various embodiments may be combined with each other unless specifically stated otherwise.

While embodiments will be described in the context of video streaming, the devices, systems and methods according to embodiments may also be used in association with audio streaming or other media or data streaming.

While some embodiments will be described in which a video streaming session assistance node is integrated with a radio access network (RAN) of a cellular communication network, other implementations of the video streaming session assistance node may be used. For illustration, the video streaming assistance according to embodiments may also be provided in non-cellular networks, mesh networks, or other networks. The video streaming assistance according to embodiments may also be implemented across a Wi-Fi interface or other wireless local area network (WLAN) interface.

While some embodiments will be described in the context of assisting user equipments to set a suitable buffering strategy or a suitable initial video quality in a video streaming session, the embodiments are not limited to these exemplary embodiments. Rather, a wide variety of other parameters used by the user equipment to execute a video streaming session may be determined based on characteristics reported by this user equipment or other user equipments to a video streaming session assistance node.

Figure 1:
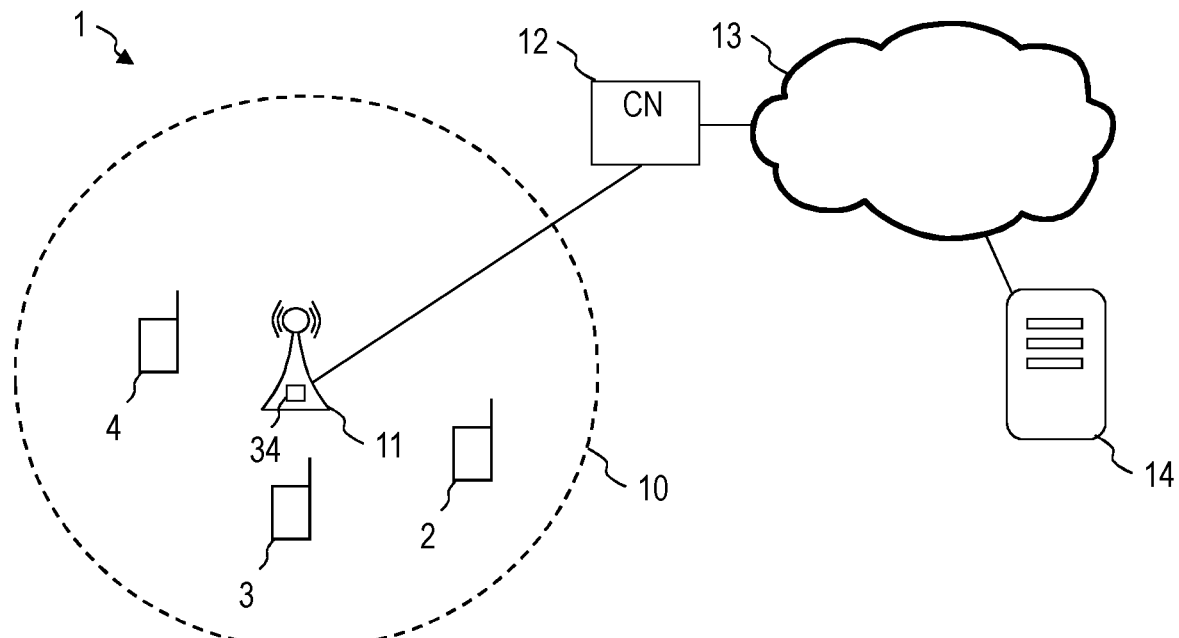
FIG. 1 is a schematic view of a system according to an embodiment.

FIG. 1 is a schematic view of a communication system 1 according to an embodiment. The communication system 1 comprises a user equipment 2. The communication system 1 may comprise at least one further user equipment 3, 4. The communication system 1 comprises a cellular communication network. The cellular communication network has a radio access network (RAN). The radio access network includes a plurality of base stations 11. A base station 11 is respectively operatively coupled to a core network 12. The specific configuration of the cellular communication network, of the base station 11 and of the other nodes of the cellular communication network depends on the communication standard. The cellular communication network may be a Long Term Evolution (LTE) network. In this case, the RAN is an evolved UMTS Terrestrial Radio Access Network (eUTRAN), with the base stations 11 each being an evolved Node B (eNodeB) connected to a Mobility Management Entity (MME) and/or Serving Gateway (S-GW) in the core network 12. The cellular communication network may be an LTE-Advanced communication network.

The user equipment 2 is operative to establish a video streaming session with a media streaming server 14. The media streaming server 14 may be connected to a wide area network 13, e.g. the internet. The media streaming server 14 may be configured for video streaming towards the user equipment 2. The user equipment 2 and the media streaming server 14 may be coupled by an end-to-end communication link during the video streaming session. The user equipment 2 may be operative to selectively establish the end-to-end communication link with the media streaming server 14 for the video streaming session.

More than one media streaming server 14 may be provided. For illustration, there may be several different media streaming servers 14 to store a video stream in different resolutions, with the end-to-end link being established between the user equipment 2 and a media streaming server 14 which is selected in accordance with the video quality at which the video is to be streamed to the user equipment 2.

A media streaming network assistance node 34 may be integrated in the radio access network or the core network 12 of the cellular communication network. The media streaming network assistance node 34 may be integrated into the base station 11. The media streaming network assistance node 34 may be implemented as a separate node which has an interface for information sharing with one or more radio access network nodes.

As will be described in more detail below, the user equipment 2 is operative to provide video streaming session related information to the media streaming network assistance node 34. The user equipment 2 is operative to receive, via the wireless interface, network assistance information. The received network assistance information may be generated by the media streaming network assistance node 34 based on video streaming session related information which was previously provided to the media streaming network assistance node 34 by the user equipment 2 and/or one or several further user equipments 3, 4.

The user equipment 2 may be operative to set at least one parameter of a video streaming session in dependence on the received network assistance information. The user equipment 2 may be operative to set a buffer level which must be reached to before playback of a video is commenced in dependence on the received network assistance information. Alternatively or additionally, the user equipment 2 may select a video quality from among a pre-defined set of video qualities available for the requested video stream, based on the received network assistance information. Alternatively or additionally, the user equipment 2 may set another parameter value of a streaming procedure executed by the user equipment 2 to perform streaming over the end-to-end link with the streaming server 14, based on the network assistance information received from the media streaming network assistance node 34 via a further communication link different from the end-to-end link with the streaming server 14.

As will be described in more detail below, the media streaming network assistance node 34 may be operative to receive video streaming session related information from the user equipment 2. The video streaming session related information received from the user equipment may depend on time-dependent variations in buffer level of the user equipment 2 monitored by the user equipment 2 during the video streaming session. The video streaming session related information may depend on a Quality of Experience (QoE) indicator, which may be derived from a user input at the user equipment 2 or other user behaviour.

The media streaming network assistance node 34 may be operative to receive further video streaming session related information from at least one further user equipment 3, 4.

The media streaming network assistance node 34 may store and optionally process the video streaming session related information received from one or several user equipments 2-4 for use in generating network assistance information during subsequent video streaming sessions. The media streaming network assistance node 34 may be operative to provide network assistance information to one or several user equipments 2-4 for use in video streaming sessions. The media streaming network assistance node 34 may be operative to generate the network assistance information based on the video streaming session related information received from one or several user equipments 2-4 and, optionally, based on additional information. The additional information may include measurements performed by the base station 11, measurements performed by other entities in the radio access network, operating parameters of the base station 11 or of other nodes of the cellular communication network. The additional information may include data received from another media streaming network assistance node which collects and processes video streaming session related information for user equipments located in another cell of the cellular communication network.

In a video streaming session, the user equipment 2 may be operative to communicate with the media streaming server 14 over a first communication link and to communication with the media streaming network assistance node 34 over a second communication link. The first communication link and the second communication link may use different protocols. The first communication link may use an adaptive bit rate (ABR) protocol, e.g. MPEG DASH. The second communication link may use a network assistance protocol which supports the collection of video streaming session related information by the media streaming network assistance node 34 and which supports the provision of network assistance information to the user equipment 2.

Various implementations of the media streaming network assistance node 34 may be used in embodiments.

The media streaming network assistance node 34 may comprise a storage unit in which information and data relating to video streaming sessions may be stored. The information and data includes video streaming session related information provided by the user equipments 2-4, but may include additional information.

The media streaming network assistance node 34 may be a network assistance server or may include several network assistance servers. The media streaming network assistance node 34 may include a data base. The data base may be cloud based. The data base may be implemented as a separate hardware storage medium, may be part of existing register functionality in e.g. the eNodeB 11, Packet Gateway, evolved Packet Gateway or other network node. The data base can store data independently of user equipment and streaming server identities, or it can map stored information to identifiers of the user equipment 2 and/or streaming server 14. The data base can store video streaming related information in association with identifiers such as IMEI, UICC or IP information.

The functionalities of storage and user equipment feedback mechanisms within the radio access network can also be implemented by means of so-called mobile edge computing (MEC) solutions. With MEC architecture decision logics and functionalities are included at the edge of a mobile network, e.g. with application and cloud computing functions included in system nodes within the mobile network architecture. This enables short latency and quick access to logical units described above.

The information stored by the media streaming network assistance node 34 can be collected as video streaming session related information from the user equipments 2-4. Additionally or alternatively, the user equipment 2 can send specific information for storage by the media streaming network assistance node 34.

The video streaming session related information may include a user equipment Identity such as IMEI, a user equipment profile from its operating system, a UICC ID, or another user equipment identifier.

The video streaming session related information may alternatively or additionally include a service/application identity identifying the specific services which require network assistance while being executed by the user equipment.

The video streaming session related information may alternatively or additionally include media description information, e.g. segment length, audio/video quality levels, or other media related information which is reported by the user equipment to the media streaming network assistance node.

The video streaming session related information may alternatively or additionally include maximum, minimum, and/or average buffer levels of the user equipment buffer. The buffer level indicates the amount of remaining playback time for locally stored streaming media within user equipment buffer.

The video streaming session related information may alternatively or additionally include a time between consecutive user equipment initiated buffer refills.

The video streaming session related information may alternatively or additionally include statistics on the number of segments per buffer refill.

The video streaming session related information may alternatively or additionally include number of buffer underruns and/or duration of each underrun. An underrun condition occurs when the buffer level reaches or falls below a threshold which causes playback of the video to be paused.

Additional or alternative information elements relating to the characteristics of the user equipment upon execution of a streaming algorithm may be included in the video streaming session related information.

In case specific information is sent from the user equipment 2 for storage by the media streaming network assistance node 34 this can be any of above session related information sent in a specific storage protocol message, as will be described in more detail below. For a media streaming network assistance node 34 implemented by mobile edge computing functionality, e.g. in an eNodeB, the video streaming session related information can be stored locally with low latency for access and low total system control signalling load.

The media streaming network assistance node 34 may be operative to analyse the video streaming session related information received from user equipments. The media streaming network assistance node 34 may be operative to process the video streaming session related information received from user equipments into local and/or global video streaming related information. Local video streaming related information may be related to a specific radio access network cell 10 or base station 11, or to a group of user equipments. The group of user equipments may include all or a fraction of user equipments located in the respective cell 10 which perform video streaming. The local video streaming related information may be generated by analysing how user equipments or specific types of user equipments in the cell 10 perform buffering in a video streaming session, for example. The local video streaming related information may define which buffer strategies would be suitable or even optimum for user equipments located in the respective cell 10, based on the previously gathered video streaming session related information. Global information may include statistics derived from video streaming session related information from a plurality of cells and user equipments, e.g., from all cells and user equipments located in a pre-defined geographic area, which may be a certain country.

The media streaming network assistance node 34 may be operative to associate the stored video streaming session related information with network specific parameters. One example of how this can be implemented is for the data base to collect and calculate statistics, e.g. of buffer usage or video quality settings, for respectively a plurality of different network characteristics. This can be implemented as calculating statistical descriptions of the session related information on cell level, on radio access technology level or on service level. An averaging $$\overline{B} = \sum_{i=1}^{N} \mu_i B_i \qquad (1)$$

may be performed, where $B_i$ is buffer level of user equipment i, N is the total number of user equipments for which averaging is performed during the averaging period, and $p_i$ are weighting factors. The weighting factors may be selected to fulfil $$\sum_{i=1}^{N} \mu_i = 1. \qquad (2)$$

For illustration, each weighting factor may be set to be $\mu_i=1/N$.

The averaging time over which the averaging is performed by the media streaming network assistance node 34 may be on the order of minutes, hours, or may exceed several hours.

The respectively determined averaged buffer level may be associated with network characteristics during the time in which the averaging is performed. Time-dependent variations in buffer level, averaged over several user equipments, may be associated with the respective radio access network conditions at that time to provide further improved network assistance.

The averaging indicated in equations (1) and (2) is one example of statistics calculations performed by the media streaming network assistance node 34. Other statistical parameters can be calculated by the media streaming network assistance node 34 based on the video streaming related information. The variance, the skew or other indicators for the statistical distribution of reports video streaming session related data may be computed, for example.

The cellular communication network may use the statistical information determined by the media streaming network assistance node 34. The media streaming network assistance node 34 may provide other systems and interfaces with local and global video streaming information. Alternatively or additionally, the media streaming net work assistance node 34 may provide further improved session related network assistance, in which user equipment(s) are assisted in identifying suitable buffering strategies, initial video quality settings, or other streaming parameters based on previously collected video streaming session related information.

To this end, the media streaming network assistance node 34 may have a further interface for sharing data derived from the video streaming session related information that was received from user equipments. For illustration, a media streaming network assistance node 34 associated with one or several base stations 11 may share the data with one or several other media streaming network assistance nodes that respectively collect and analyse video streaming session related information in other cells.

The media streaming network assistance node 34 may be operative to share data derived from the video streaming session related information for resource reservation and/or allocation. For example the media streaming network assistance node 34 may be logically and optionally also physically connected with a network packet data scheduler in the eNodeB. The eNodeB packet scheduler can get information about expected traffic requests, user equipment buffer status, segment sizes or other information to improve scheduling load estimates and reduce user equipment buffer underrun probabilities.

The media streaming network assistance node 34 may be operative to assist user equipments 2-4 in selecting suitable streaming algorithm parameters. When a user equipment accesses a network or part of a network that includes network assistance, the stored information from the media streaming network assistance node 34 can be used by the network to assist the device to more quickly select suitable parameters for a video streaming session. For illustration, upon streaming session setup the user equipment can get a response from the media streaming network assistance node 34 which includes network assistance information derived from previous video streaming session related information. E.g., the response provided at setup of the streaming session can include average user equipment related statistics from session related information, e.g. buffering levels (maximum, minimum, and/or average), number of segments downloaded per buffer refill activity, or any one of a wide variety of other parameters.

While using a MEC architecture is one implementation example that simplifies the signalling and reduces latency compared with other cloud based solutions, the media streaming network assistance node 34 may also be implemented at other locations, e.g. within the core network 12.

Figure 2:
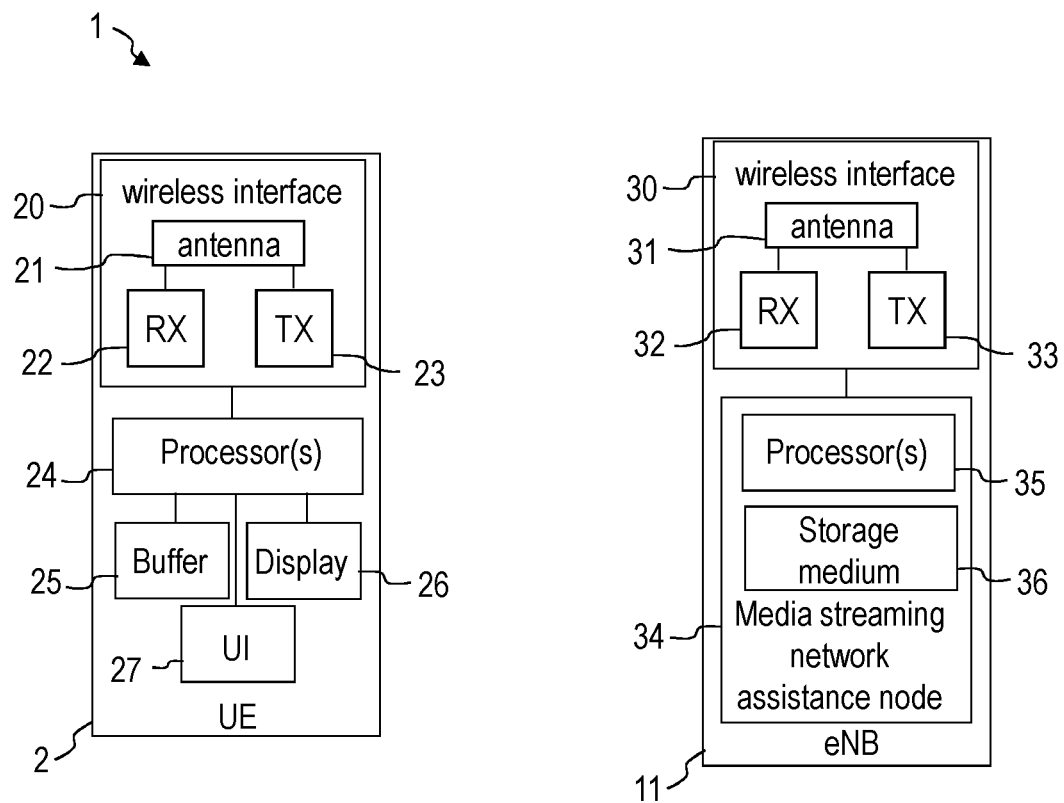
FIG. 2 is a schematic view of a system according to an embodiment.

FIG. 2 shows a block diagram view of the communication system 1 of FIG. 1.

The user equipment 2 has a wireless interface 20. The wireless interface 20 comprises an antenna 21, a receiver path 22 and a transmitter path 23. The wireless interface 20 is operative to communicate with the base stations 11, 12. The wireless interface 20 may be configured for communication over the eUTRA air interface. The wireless interface 20 may be operative to establish a first communication link with the media streaming server 14 in a video streaming session. The wireless interface 20 may be operative to establish a second communication link with the media streaming network assistance node 34 to provide video streaming session related information to the media streaming network assistance node 34 and/or to receive network assistance information from the media streaming network assistance node 34.

The user equipment 2 may be operative to receive network assistance information via the receiver path 22. At least one processor 24 of the user equipment 2 may use the network assistance information to set parameter(s) of a streaming procedure.

The parameter(s) may include one or several parameters associated with buffering of video signals. For illustration, the buffer level to which a buffer 25 must be filled with video data before the video is output via a display 26 may be determined based on the received network assistance information provided by the media streaming network assistance node 34. An initial video quality, selected from various video quality levels such as high, medium, and low resolution, may be set based on the received network assistance information provided by the media streaming network assistance node 34.

The user equipment 2 may be operative to receive signals carrying a stream of video data via the wireless interface 20. The signals carrying the stream of video data may be demodulated by the at least one processor 24, may be buffered in the buffer 25, and may be read from the buffer 25 for outputting via the display 26. Parameters of the streaming procedure, such as segment lengths or other parameters, may be set in dependence on the received network assistance information provided by the media streaming network assistance node 34.

The user equipment 2 may monitor characteristics during the video streaming session. The characteristics may include a buffer level of the buffer 25 or may be derived from the buffer level of the buffer 25. The characteristics may be indicative of a QoE of a video. The QoE may be derived from a user input received at a user interface 27, which may allow the user to rate the QoE. The QoE may be automatically derived, e.g. based on a number of pauses in the video playback required for buffer refilling, based on whether the user interrupts or stops the video playback, or based on other criteria.

The user equipment 2 may be operative to control the transmit path 23 to transmit video streaming session related information to the media streaming network assistance node 34. The at least one processor 24 may generate the video streaming session related information based on the monitored characteristics.

The video streaming session related information may include an identifier for the user equipment 2, for an application or service executed by the user equipment 2 which requests network assistance for video streaming, and/or information describing the media, which may include information on segment lengths or other information. The at least one processor 24 may be operative to control the transmit path 23 to transmit such video streaming session related information.

The video streaming session assistance node 34 may be included in a cellular network node, e.g. an eNodeB, or may be otherwise communicatively coupled to the cellular communication network. The video streaming session assistance node 34 may be a server which is connected to the radio access network or core network or which is integrated with a node of the radio access network or core network.

The media streaming network assistance node 34 may comprise at least one processor 35. The at least one processor 35 may be operative to process video streaming session related information provided by the user equipment 2. The at least one processor 35 may control storage of the video streaming session related information in a storage medium 36 which may be provided locally at the media streaming network assistance node 34 or which may be remote from the media streaming network assistance node 34, e.g. in a cloud.

The at least one processor 35 may process the video streaming session related information to provide network assistance to user equipments, cellular communication network nodes, or other entities. The at least one processor 35 may derive statistical information from buffer levels reported by plural user equipments to determine a suitable buffer level at which a user equipment in the cell served by the eNodeB 11 may start outputting the video via the display 26. The at least one processor 35 may derive statistical information from QoE reported by plural user equipments to determine which video quality setting, e.g. high, medium or low resolution, would be appropriate for video streaming to the respective user equipment.

The processing described above may be performed in dependence of the type of user equipment. For illustration, the at least one processor 35 may take into account the radio capabilities of the user equipments which reported the video streaming session related information and of the user equipments which request network assistance for video streaming.

The media streaming network assistance node 34 may have an interface to output data usable by the user equipment 2 in identifying suitable parameters for the video streaming session. The media streaming network assistance node 34 may be logically and possibly even physically coupled to a transmit path of a wireless interface 30 of the eNodeB, to cause network assistance information to be transmitted to the user equipment 2. The media streaming network assistance node 34 may have another interface which allows it to share data derived from the video streaming session related information to other media streaming network assistance nodes, core network nodes, or servers. The media streaming network assistance node 34 may be operative to communicate with a scheduler of the eNodeB, to allow the scheduler to perform resource reservation and/or allocation in dependence on the video streaming session related information received by the media streaming network assistance node 34.

The user equipment 2 and/or the media streaming network assistance node 34 may be used in the system of FIG. 1. The user equipment 2 and/or the media streaming network assistance node 34 may be operative to perform any one of the processing acts described with reference to FIG. 1.

While a media streaming network assistance node 34 integral with a base station is shown in FIG. 1 and FIG. 2, the media streaming network assistance node 34 may be integral with another radio access network node or may be formed as a separate node having an information sharing connection to one or more radio access network nodes.

While a cellular network is illustrated in FIG. 1 and FIG. 2, the network assistance and streaming related information may additionally or alternatively be transmitted over other wireless interfaces, e.g. using the Wi-Fi air interface.

Figure 3:
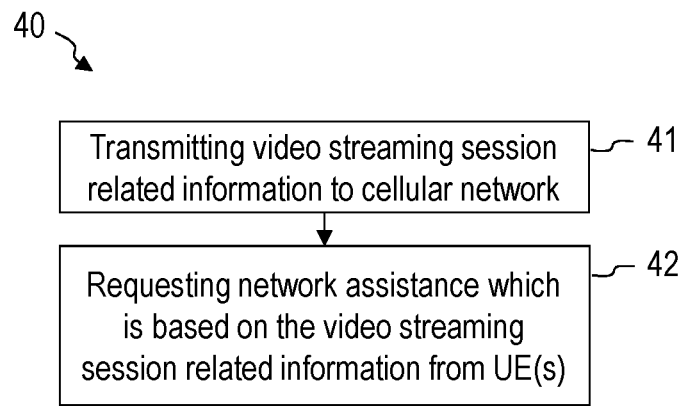
FIG. 3 is a flow chart of a method according to an embodiment.

FIG. 3 is a flow chart of a method 40. The method 40 may be performed by the user equipment 2.

At 41, the user equipment may transmit video streaming session related information to the cellular network. The user equipment may request storage of the video streaming session related information. The video streaming session related information may include information on buffer usage of the user equipment and/or a quality of experience. The video streaming session related information may optionally include an identifier for the user equipment, the user equipment type (e.g. model or operating system information), the service executed by the user equipment which requires network assistance, and/or media information on the media of the media streaming session.

At 42, the user equipment may request network assistance. The network assistance may be provided by the cellular communication network to the user equipment to assist the user equipment in identifying suitable or even optimum settings for a video streaming session. The network assistance information received by the user equipment may be used by the user equipment to identify at least one threshold for the buffer level. The network assistance information received by the user equipment may be used by the user equipment to identify a threshold which the buffer level must reach before outputting of the media is started. The network assistance information received by the user equipment may be used by the user equipment to identify which one of several available media quality levels, such as high, medium or low, should be the initial video quality setting.

While the video streaming session is in progress, the user equipment may report video streaming session related information to the cellular communication network for processing by the media streaming network assistance node 34.

Figure 4:
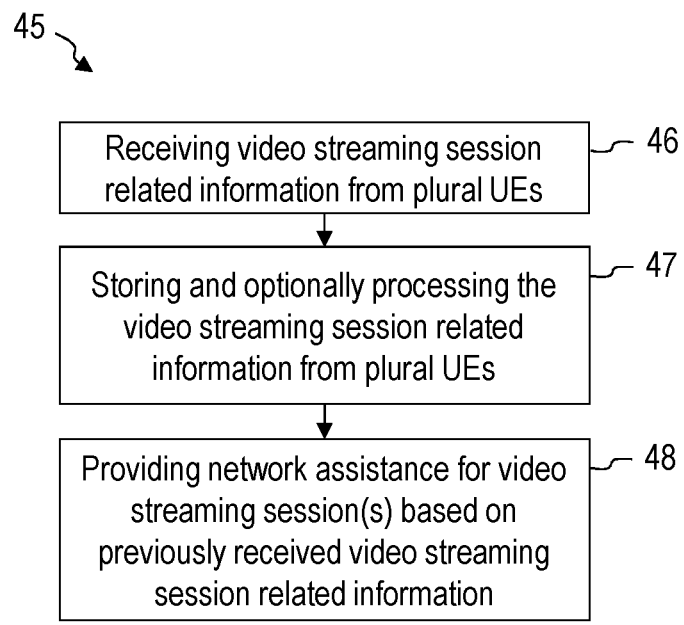
FIG. 4 is a flow chart of a method according to an embodiment.

FIG. 4 is a flow chart of a method 45. The method 45 may be performed by the media streaming network assistance node 34.

At 46, the media streaming network assistance node 34 receives video streaming session related information from a user equipment 2. The media streaming network assistance node 34 may receive further video streaming session related information from at least one further user equipment 3, 4. The media streaming network assistance node 34 may actively poll the video streaming session related information from one or several user equipments.

The media streaming network assistance node 34 may receive the video streaming session related information over a communication link which is different from the end-to-end link established between the user equipment 2 and the media streaming server 14.

At 47, the media streaming network assistance node 34 may store the video streaming session related information received from one or several user equipments 2-4. The media streaming network assistance node 34 may store the video streaming session related information locally at a node in the radio access network or remotely from the media streaming network assistance node 34, e.g. in a cloud.

The media streaming network assistance node 34 may process the video streaming session related information received from one or several user equipments 2-4. The media streaming network assistance node 34 may process buffer levels or information indicative of a suitable video quality setting. The video streaming session related information may be processed by averaging or other statistical operations. The media streaming network assistance node 34 may be operative to provide a result of the processing to other entities in the network and/or to retrieve information on video streaming related information from other media streaming network assistance nodes.

The media streaming network assistance node 34 may be operative to correlate the processed video streaming session related information with radio access network conditions. For illustration, the average buffer levels or number of buffer underruns per time or the QoE indicator may be respectively compared to the radio access network loads. This facilitates the provision of network assistance for video streaming sessions, taking into account the radio access network conditions in the cell in which a user equipments requires network assistance.

At 48, the media streaming network assistance node 34 may provide network assistance for a video streaming session. The media streaming network assistance node 34 may provide information to a user equipment 2 which assists the user equipment to set at least one parameter of a buffering procedure. For illustration, the media streaming network assistance node 34 may provide information to a user equipment 2 which assists the user equipment in setting a threshold level to which the buffer must be filled before media playback is started. The media streaming network assistance node 34 may provide information to a user equipment 2 which assists the user equipment in setting an initial video quality for initiating the video streaming session. The user equipment 2 may use this suggested video quality as a default for the respective video streaming session, which may subsequently be changed by the user.

The network assistance provided by the media streaming network assistance node 34 may be dependent on at least the video streaming session related information provided by the user equipment 2 which requests network assistance and/or video streaming session related information provided by user equipments 3, 4 different from the one which requests network assistance. The type of user equipments and/or its hardware setup may be taken into account by the media streaming network assistance node 34 to ensure that the network assistance provided to a user equipment 2 is appropriate for the capabilities and hardware of the respective user equipment 2.

Figure 5:
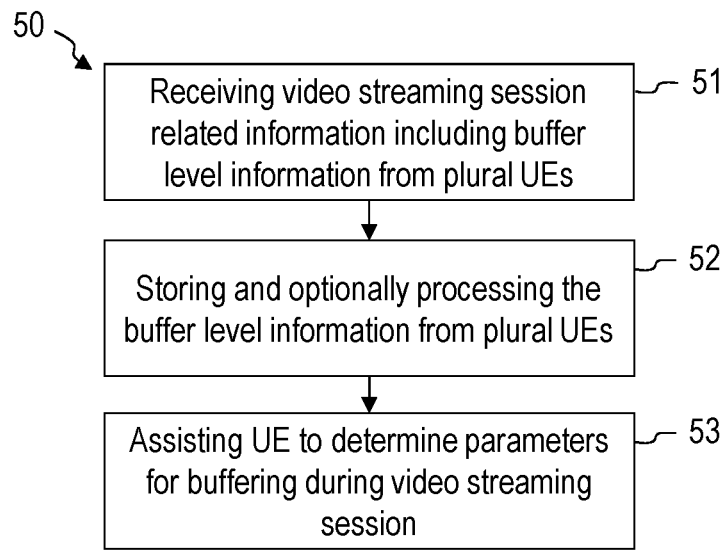
FIG. 5 is a flow chart of a method according to an embodiment.

FIG. 5 is a flow chart of a method 50. The method may be performed by the media streaming network assistance node 34.

At 51, the media streaming network assistance node 34 may receive video streaming session related information from one or several UEs. The video streaming session related information may respectively include buffer level information. The buffer level information may include information on average buffer levels, maximum buffer levels, minimum buffer levels, a number of buffer underruns in which the buffer level falls below an underrun threshold which triggers video playback to pause, a duration of each buffer underrun, an average duration of buffer underruns, or other information derived from the time-varying buffer level.

At 52, the buffer level information may be stored and optionally processed further. The processing may include deriving statistical information, such as a mean value, a variance, a skew or other statistical values, from the reported buffer level information. For illustration, a number of buffer underruns reported by user equipments in the same cell and/or of the same type may be averaged. The average, maximum or minimum buffer levels reported by several user equipments may be averaged.

At 53, the media streaming network assistance node 34 may generate network assistance information for transmission to the user equipment 2, to assist the user equipment 2 in setting buffering parameters. The user equipment 2 may be configured to set a threshold which must be reached by the buffer level before the media outputting is started in dependence on the received network assistance information.

Figure 6:
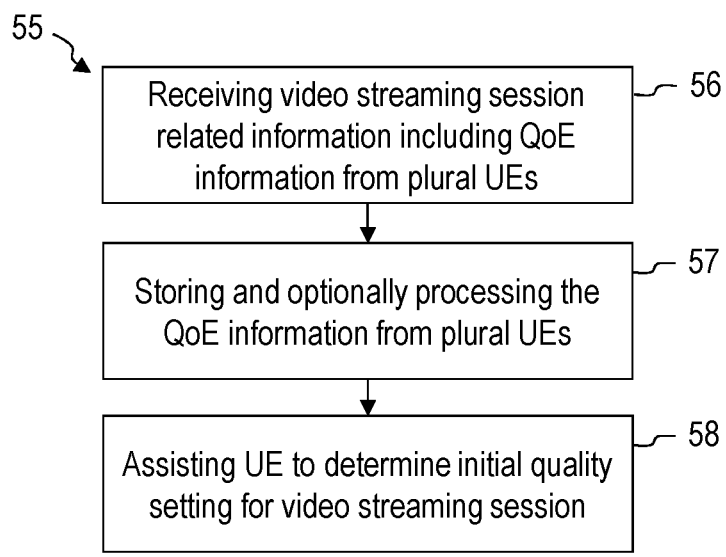
FIG. 6 is a flow chart of a method according to an embodiment.

FIG. 6 is a flow chart of a method 55. The method may be performed by the media streaming network assistance node 34.

At 56, the media streaming network assistance node 34 may receive video streaming session related information from one or several UEs. The video streaming session related information may respectively include QoE indicators. The QoE indicators may include information on a QoE for the respective video quality, e.g. a feedback on the video quality received from the user. The feedback may be derived from whether the user terminated the video streaming session, whether there have been frequent buffer underruns, whether the user changed from a higher video resolution to a lower video resolution, or other QoE indicators.

At 57, the QoE indicators may be stored and optionally processed further. The processing may include deriving statistical information, such as a mean value, a variance, a skew or other statistical values, from the reported QoE indicators.

At 58, the media streaming network assistance node 34 may generate network assistance information for transmission to the user equipment 2, to assist the user equipment 2 in identifying streaming algorithm parameters. The user equipment 2 may be configured to set an initial video quality in dependence on the received network assistance information.

Other video streaming session related information and/or other network assistance information may be used. For illustration, information on segment lengths in a video streaming session may be reported to and processed by the media streaming network assistance node 34.

In the methods of FIG. 3 to FIG. 6, one or several different messages may be used to transfer video streaming session related information from the UE to the media streaming network assistance node 34. The UE may transmit video streaming session related information to the media streaming network assistance node 34 in a network assistance session setup message. The UE may subsequently transmit video streaming session related information to the media streaming network assistance node 34 in a network assistance storage request, for example, as will be explained in more detail with reference to FIG. 9 to FIG. 11 below. The media streaming network assistance node 34 may transmit assistance information in a network assistance session setup response message or in a network assistance response message, for example, as will be explained in more detail with reference to FIG. 9 to FIG. 11 below.

In the devices, methods and systems explained with reference to FIG. 1 to FIG. 6, the user equipment 2 may establish an end-to-end communication link with the media streaming server 14. The user equipment 2 may additionally establish a further communication link with the media streaming network assistance node 34, over which network assistance is provided to the user equipment 2 which assists the user equipment 2 in identifying suitable parameters for the video streaming session.

Figure 7:
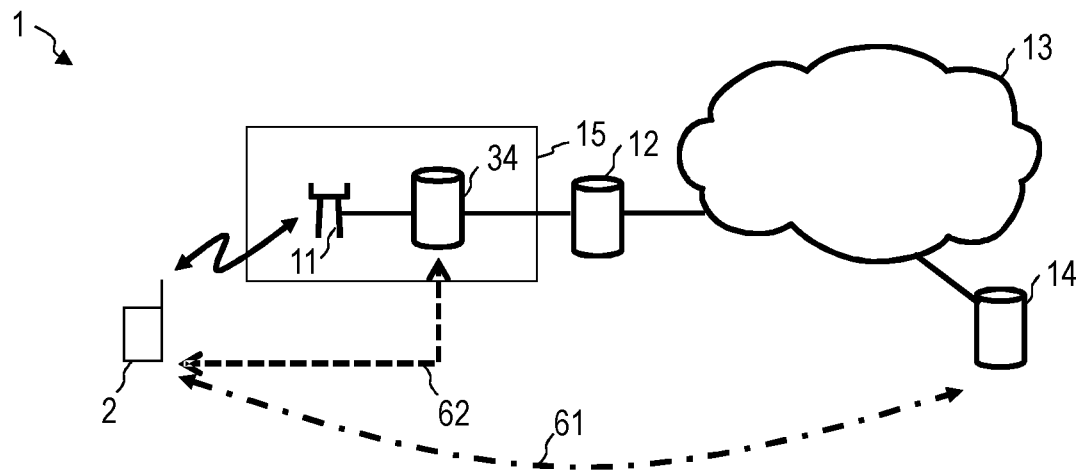
FIG. 7 is a schematic view of a system according to an embodiment.

FIG. 7 is a schematic view of the communication system 1 of FIG. 1 and FIG. 2. The user equipment 2 establishes an end-to-end communication link 61 with the media streaming server 14. The end-to-end communication link 61 may use an adaptive bit rate (ABR) protocol, e.g. MPEG DASH. The user equipment 2 establishes a second communication link 62 with the media streaming network assistance node 34, over which the user equipment 2 provides video streaming related information to the media streaming network assistance node 34. A protocol used for the further communication link 62 may be different from the ABR protocol on the end-to-end communication link 61. The user equipment 2 may utilize network assistance information received from the media streaming network assistance node 34 for improving the video streaming over the end-to-end communication link 61, based on video streaming related information previously reported by the user equipment 2 and, optionally, other user equipments.

The signals carrying data in the end-to-end communication link 61 and the signals carrying data in the further communication link 62 may respectively be radio signals transmitted over the air interface of the radio access network.

Figure 8:
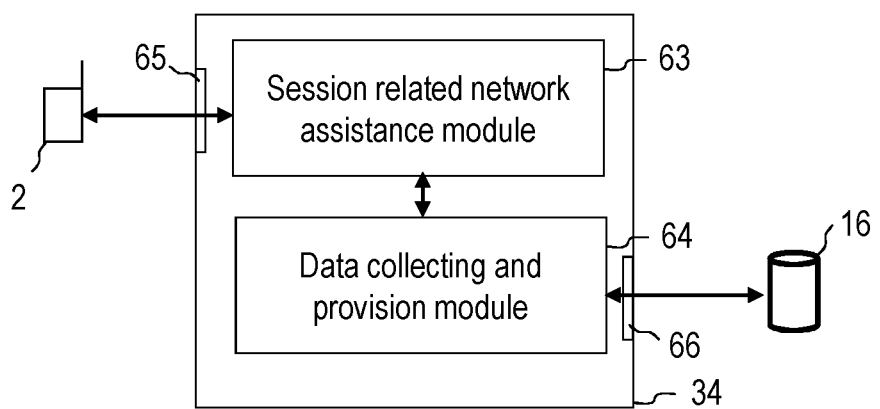
FIG. 8 is a schematic view of a system according to an embodiment.

FIG. 8 is a functional block diagram view of a media streaming network assistance node 34. The media streaming network assistance node 34 may be used in the systems and methods of FIG. 1 to FIG. 7.

The media streaming network assistance node 34 may include a session related network assistance module 63. The session related network assistance module 63 may be operative to collect video streaming session related information from the user equipment 2. The session related network assistance module 63 may be operative to provide network assistance information to the user equipment 2 to assist the user equipment 2 in adaptive streaming.

The media streaming network assistance node 34 may comprise a first interface 65 over which the session related network assistance module 63 collects the video streaming session related information from one or several user equipments and over which the media streaming network assistance node 34 provides network assistance to one or several user equipments.

The media streaming network assistance node 34 may include a data collecting and providing module 64. The data collecting and providing module 64 may be operative to store video streaming session related information from the user equipment 2. The data collecting and providing module 64 may be operative to store data derived by processing the video streaming session related information from one or several user equipments. The data collecting and providing module 64 may be operative to provide the stored data to the session related network assistance module 63 when assistance is to be provided to the user equipment in adaptive streaming.

The session related network assistance module 63 may retrieve data stored by the data collecting and providing module 64 to generate network assistance information.

The media streaming network assistance node 34 may comprise a second interface 66 over which the data collecting and providing module 64 may share data with other media streaming network assistance nodes which may be provided in the radio access network or outside of the radio access network.

Figure 9:
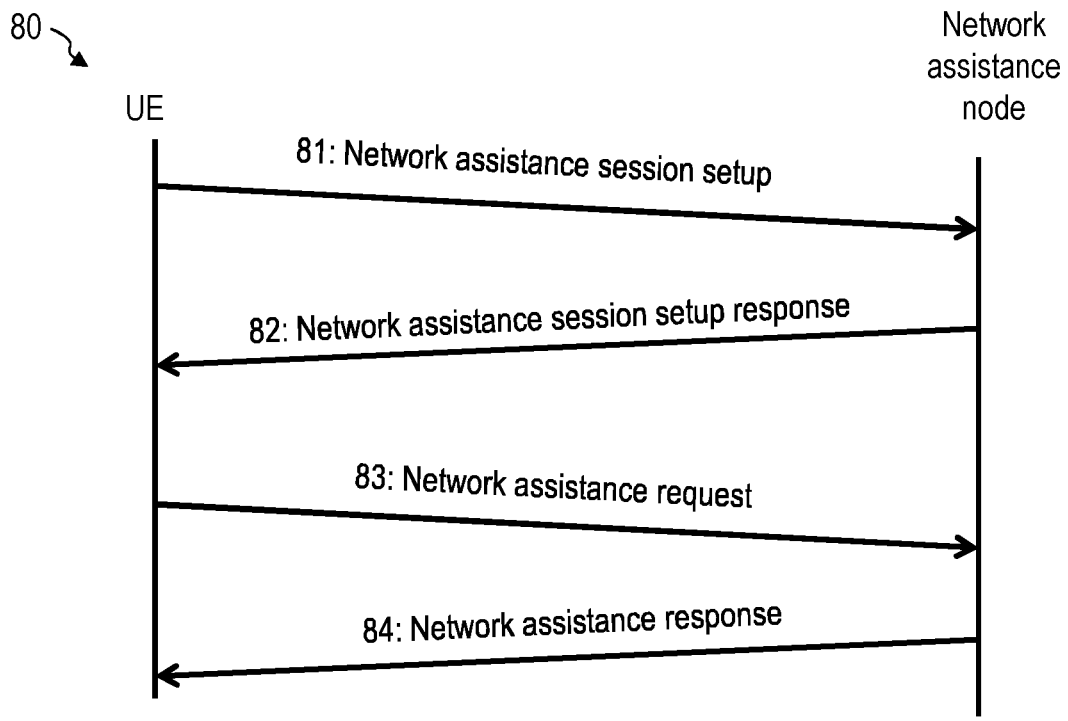
FIG. 9 is a diagram which shows a signalling in a system according to an embodiment.

FIG. 9 is a diagram 80 which shows a signalling in a communication system according to an embodiment.

When a video streaming session is established, the user equipment 2 may request assistance from the media streaming network assistance node 34. To set up a network assistance session, the user equipment 2 may transmit a network assistance session setup message 81. The network assistance session setup message 81 may include an identifier for the user equipment and/or a service in the user equipment which requests the network assistance and/or the video streaming session and/or the media. The network assistance session setup message 81 may include buffer parameters of the user equipment. Alternatively or additionally, the network assistance session setup message 81 may include media parameters, such as a segment length of the media.

The media streaming network assistance node 34 may generate a network assistance session setup response message 82. The network assistance session setup response message 82 may include an ACK/NACK for the video session setup. The network assistance session setup response message 82 may optionally include network assistance information for use in adaptive streaming by the user equipment.

The network assistance information included in the network assistance session setup response message 82 may include one or several buffer parameters. The buffer parameter(s) may allow the user equipment 2 to determine a buffer filling level which must be reached before outputting of the media is started, for example.

The network assistance information included in the network assistance session setup response message 82 may include timing and/or segment parameters. The timing and/or segment parameters may assist the user equipment 2 in determining suitable segment lengths of the media and/or a timing for the adaptive streaming.

The network assistance information included in the network assistance session setup response message 82 may include an identifier for a suitable initial video quality setting. The user equipment 2 may use the video quality setting to determine which one of several pre-defined video quality levels should be selected.

During the network assistance session, the user equipment 2 may transmit a network assistance request 83 to trigger the media streaming network assistance node 34 to provide network assistance information. The user equipment 2 may include video streaming session related information in the network assistance request 83. The video streaming session related information may be derived by the user equipment 2 from time-varying buffer levels of the buffer in which the video data are buffered, from user input, or from other characteristics monitored during the video streaming session.

In response to the network assistance request 83, the media streaming network assistance node 34 may transmit a network assistance response message 84 which includes network assistance information for the adaptive bitrate streaming. The network assistance information may include one or several parameters which the user equipment 2 can use in the streaming algorithm. The network assistance response message 84 may also include media selection support, which assists the user equipment in selecting appropriate media. For illustration, for media that are available in different quality levels, the media selection support may assist the user equipment in selecting the appropriate quality level, at the beginning of the video streaming session or during an ongoing video streaming session.

Figure 10:
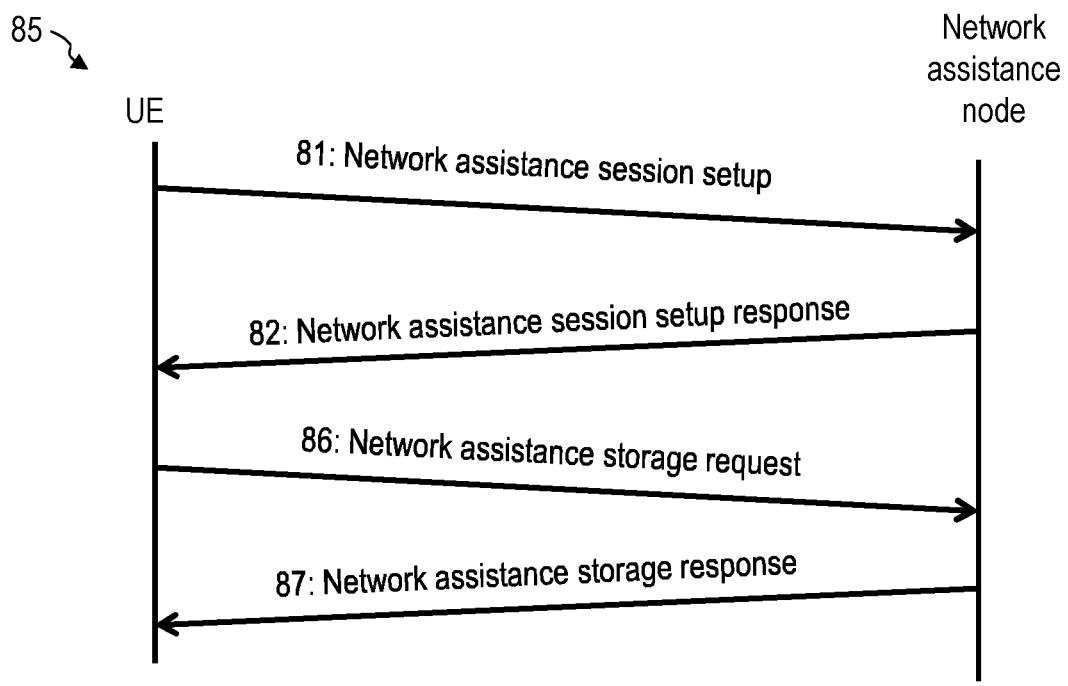
FIG. 10 is a diagram which shows a signalling in a system according to an embodiment.

FIG. 10 is a diagram 80 which shows a signalling in a communication system according to an embodiment.

After the network assistance session has been set up, which may be performed as described with reference to FIG. 9, the user equipment may transmit a dedicated network assistance storage request 86 to cause storage of video streaming related information by the media streaming network assistance node 34.

The network assistance storage request 86 may include video streaming session related information which pertains to the status of the video streaming session that is in progress. The video streaming session related information may be derived by the user equipment 2 from time-varying buffer levels of the buffer in which the video data are buffered, from user input, or from other characteristics monitored during the video streaming session.

The video streaming session related information may indicate a maximum buffer level of the user equipment in the media streaming session. Alternatively or additionally, the video streaming session related information may indicate a minimum buffer level of the user equipment in the media streaming session. Alternatively or additionally, the video streaming session related information may indicate an average buffer level of the user equipment in the media streaming session. Alternatively or additionally, the video streaming session related information may indicate a time between user equipment initiated buffer refills. Alternatively or additionally, the video streaming session related information may indicate a number of segments per buffer refill. Alternatively or additionally, the video streaming session related information may indicate a number of buffer underruns. Alternatively or additionally, the video streaming session related information may indicate durations of each buffer underrun. Alternatively or additionally, the video streaming session related information may indicate a quality of experience indicator in the media streaming session.

The network assistance storage request 86 may include an identifier for the user equipment and/or an identifier for an application module of the user equipment which requires the network assistance information.

In response to the network assistance storage request 86, the media streaming network assistance node 34 may transmit a network assistance storage response message 87. The network assistance storage response message 87 may include an acknowledgment status, such as ACK/NACK, for the storage of the video streaming session related information. The network assistance storage response message 87 may, but does not need to include network assistance information which the user equipment uses for adaptive streaming.

Figure 11:
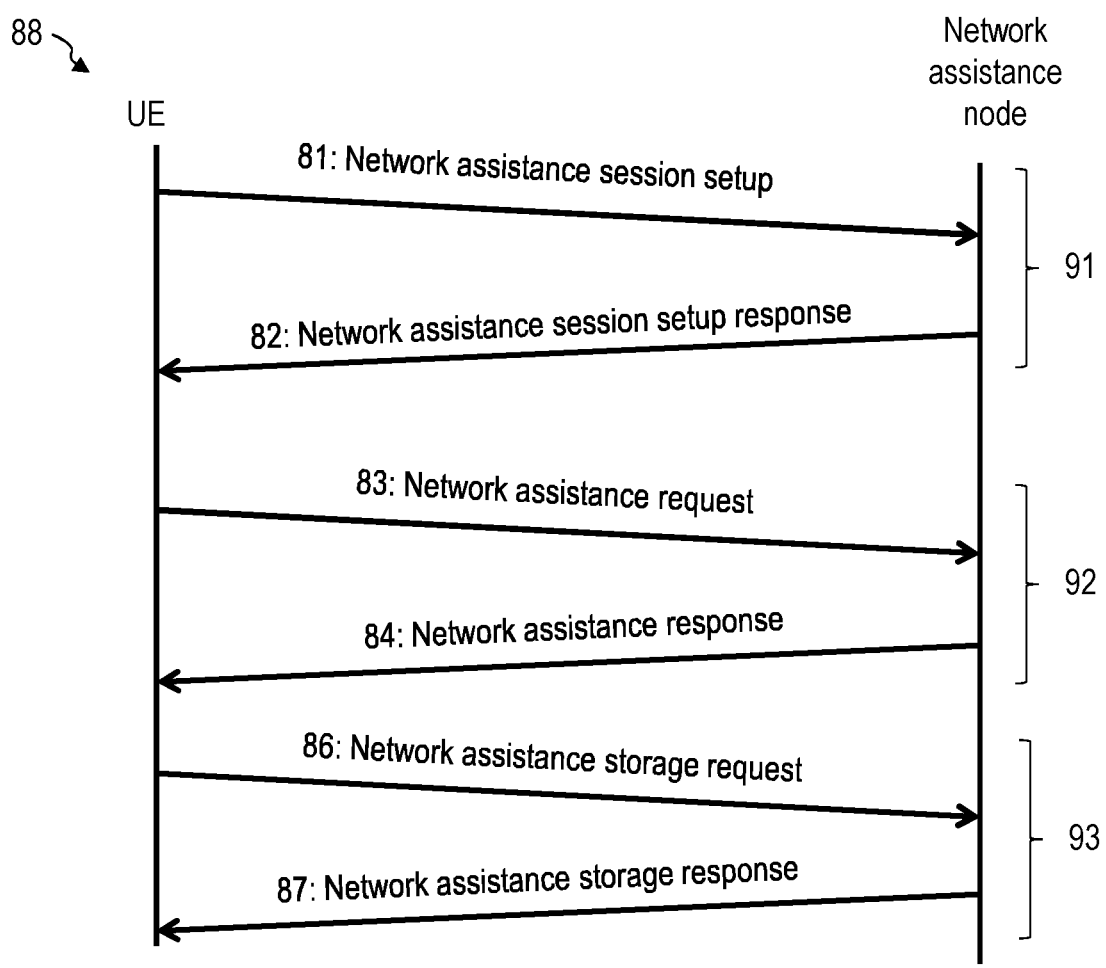
FIG. 11 is a diagram which shows a signalling in a system according to an embodiment.

FIG. 11 is a diagram 90 which shows a signalling in a communication system according to an embodiment. As illustrated in FIG. 11, after the network assistance session has been established at 91, the user equipment may request network assistance at 92. Alternatively or additionally, the user equipment may request storage of the video streaming session related information at 93. The messages may be implemented as described with reference to FIG. 9 and FIG. 10.

Figure 12:
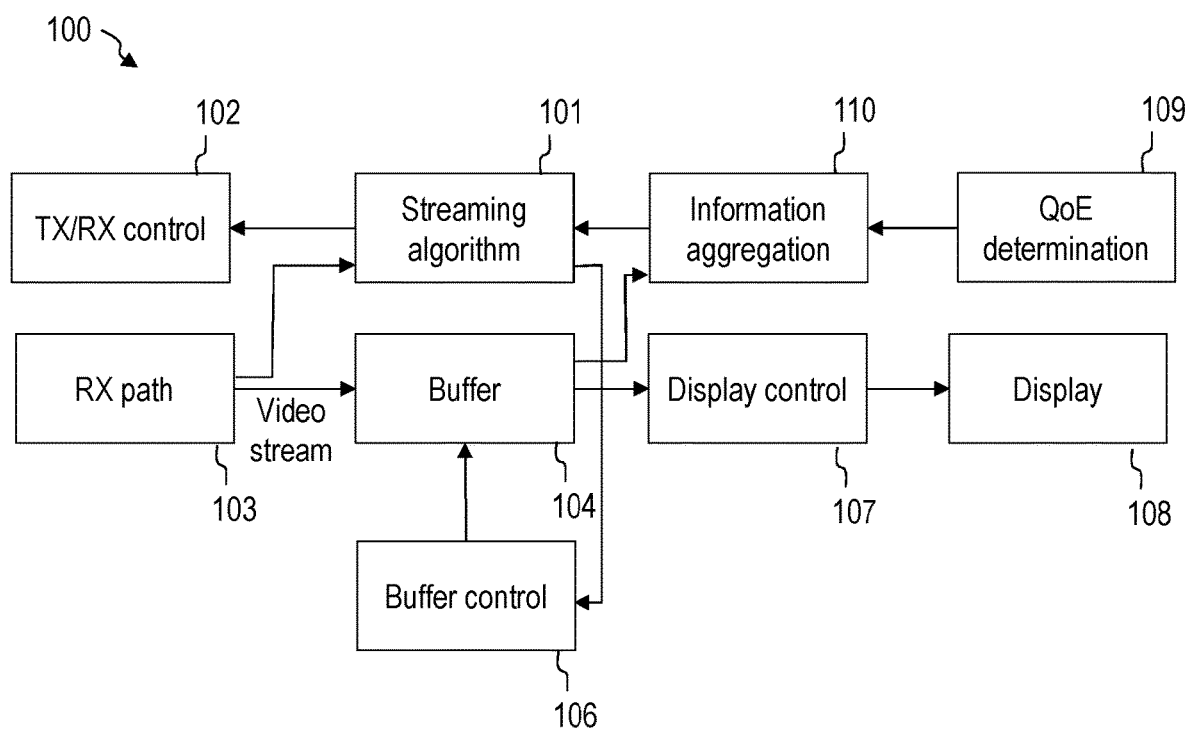
FIG. 12 is a functional block diagram of a processing device of a user equipment according to an embodiment.

FIG. 12 is a block diagram representation 100 of a user equipment 2 according to an embodiment.

The user equipment comprises a receive path 103 to receive video data in a video streaming session. The receive path 103 is operative to receive network assistance information in a network assistance session, to assist in adaptive streaming. The video data may be buffered in a buffer 104. A display control 107 may retrieve video data from the buffer 104 for controlling a display 108.

The user equipment 2 comprises a streaming algorithm module 101, which may be executed by a processor. A streaming algorithm module 101 may communicate with a transmit and receive control 102, e.g. to establish an end-to-end link with a streaming server 14 or for adaptation of the streaming over the end-to-end link with the streaming server 14.

One or several parameters of the streaming are set, by the user equipment, in dependence on network assistance information received at the receive path 103. Segment lengths, timing information, buffering parameters or video quality are exemplary for such parameters. The streaming algorithm module 101 may set one or several parameters of the streaming algorithm in dependence on the received network assistance, as explained with reference to FIG. 1 to FIG. 11 above.

The user equipment 2 may comprise an information aggregation module 110 to monitor characteristics during the video streaming session. The information aggregation module 110 may be operative to monitor time-dependent variations in buffer level to identify characteristics such as maximum, minimum or average buffer level. The information aggregation module 110 may be operative to monitor time-dependent variations in buffer level to identify characteristics such a number of buffer underruns and/or a duration of each buffer underrun. The information aggregation module 110 may be operative to retrieve a QoE indicator from a QoE determination module 109. The QoE determination module 109 may be operative to determine an indicator for the QoE based on buffer underruns, user input, or other characteristics.

Figure 13:
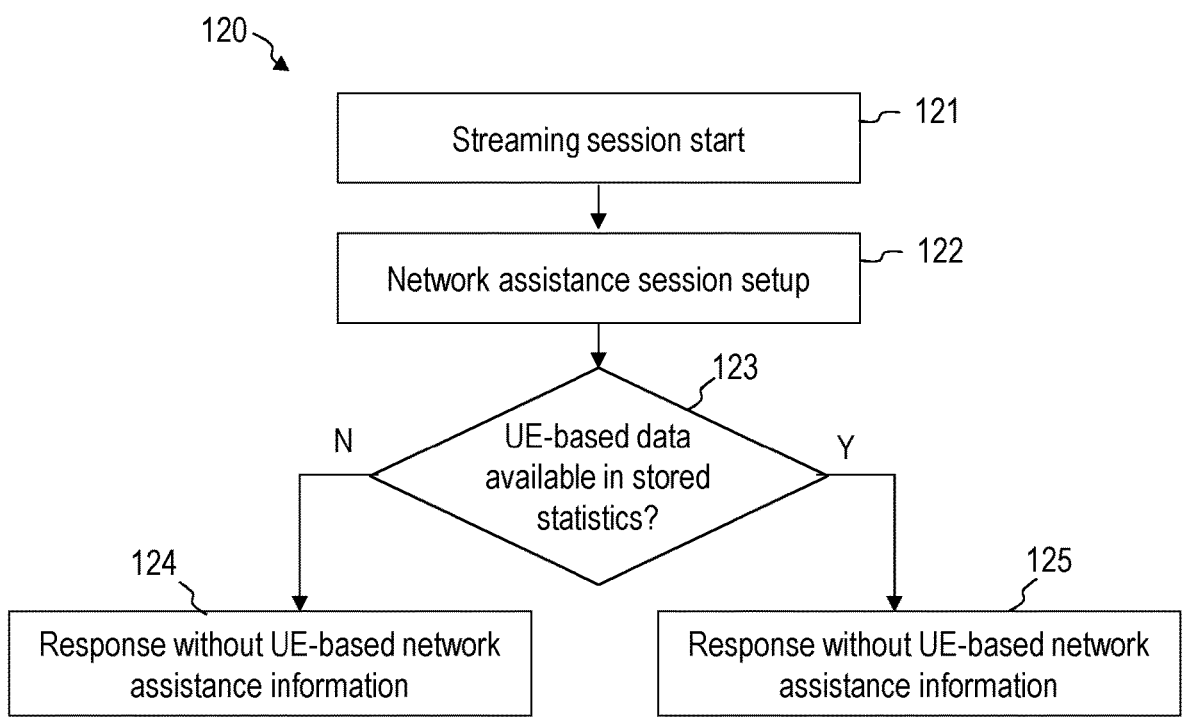
FIG. 13 is a flow chart of a method according to an embodiment.

FIG. 13 is a flow chart of a method 120. The method 120 may be performed by the media streaming network assistance node 34. The method 120 may be performed at setup of a network assistance session.

At 121, a streaming session starts. The streaming session may be initiated by the user equipment with or without network assistance.

At 122, a network assistance session setup is initiated, e.g. by the user equipment. The media streaming network assistance node 34 may receive the network assistance session setup message 81.

At 123, the media streaming network assistance node 34 may determine whether data derived from video streaming session related information provided by the user equipment which requests network assistance or by other user equipments is stored. At 125, if such statistical data derived from video streaming session related information provided by one or several user equipments is not available, the media streaming network assistance node 34 may generate the network assistance session setup response message 82 such that it does not include network assistance information that is based on video streaming session related information from user equipments. The network assistance session setup response message 82 may nevertheless still include network assistance information that depends on RAN parameters, for example, and which is not based on user equipment reports.

At 124, if such statistical data derived from video streaming session related information provided by one or several user equipments is available, the media streaming network assistance node 34 may generate the network assistance session setup response message 82 such that it include network assistance information. The network assistance information may include one or several parameters which assist the user equipment 2 in adaptive streaming and/or which assist the user equipment 2 in identifying suitable media, e.g. a video having a suitable quality level.

Figure 14:
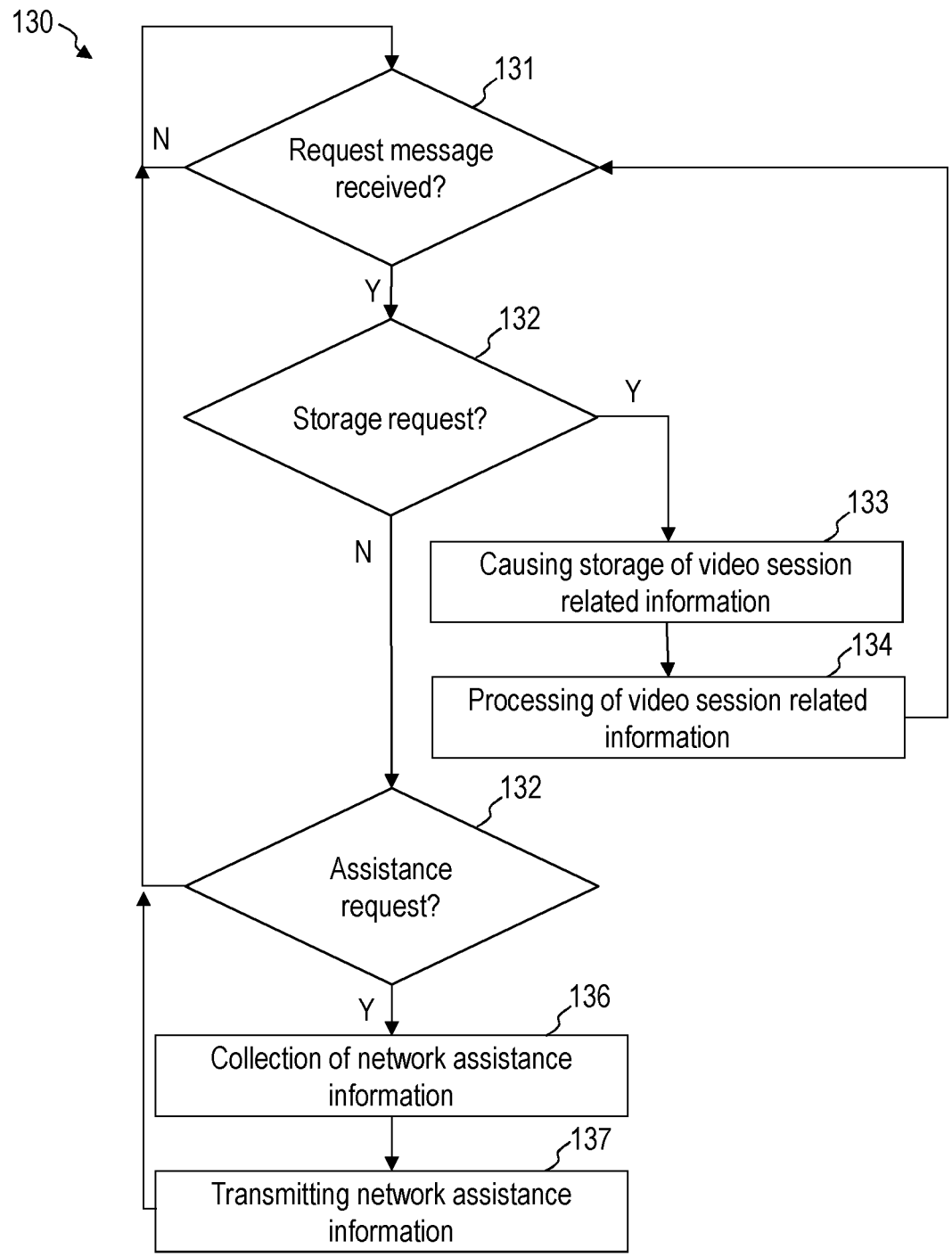
FIG. 14 is a flow chart of a method according to an embodiment.

FIG. 14 is a flow chart of a method 130. The method 130 may be performed by the media streaming network assistance node 34. The method 130 may be performed after setup of a network assistance session. The various acts described with reference to FIG. 14 may be performed after steps 124, 125 of the method 120 of FIG. 13.

At 131, the media streaming network assistance node 34 may determine whether a request message is received in the network assistance session. If no request message is received, the method may loop back to 131.

At 132, the media streaming network assistance node 34 may determine whether the received message is a network assistance storage request 86. If the received message is a network assistance storage request 86, the media streaming network assistance node 34 may retrieve the video streaming session related information from the network assistance storage request 86.

At 133, the media streaming network assistance node 34 may cause the video streaming session related information from the network assistance storage request 86 to be stored. The information may be stored locally in a storage medium of the media streaming network assistance node 34 or remotely from the media streaming network assistance node 34, e.g. in a cloud.

At 134, the media streaming network assistance node 34 may optionally process the received video streaming session related information. The processing may include analysing the received video streaming session related information. One or several statistical operations, such as averaging or determining a variance, may be performed. The media streaming network assistance node 34 may associate the processed statistical information with radio access network conditions and/or type information of user equipments. The statistical data may be stored. The method may re-turn to 131.

At 135, the media streaming network assistance node 34 may determine whether the received message is a network assistance request 83. At 136, if the received message is a network assistance request 83, the media streaming network assistance node 34 may access the collection of network assistance information which is based on the video streaming session related information from one or several user equipments. The media streaming network assistance node 34 may generate network assistance information which allows the user equipment to set one or several parameters for adaptive streaming. The buffer level at which the video outputting is started is one example for such a parameter. Segment length and/or timing information for the adaptive streaming are other examples. A suitable video quality setting is another example.

At 137, the media streaming network assistance node 34 may generate the network assistance response 84 which includes the network assistance information.

The generation of the network assistance response 84 may be performed in dependence on a location and/or type of the user equipment which requests the network assistance. For illustration, depending on the cell in which the user equipment is located and depending on the hardware or capabilities of the requesting user equipment, the network assistance response 84 may be generated based on video streaming session related information retrieved from user equipments in the same cell as the requesting user equipment and/or user equipments having at least a similar hardware as the requesting user equipment.

Additional method steps may be implemented. For illustration, a timer may be started by the media streaming network assistance node 34 at network assistance session start-up. Timeout of the timer may cause the network assistance session to be terminated.

Figure 15:
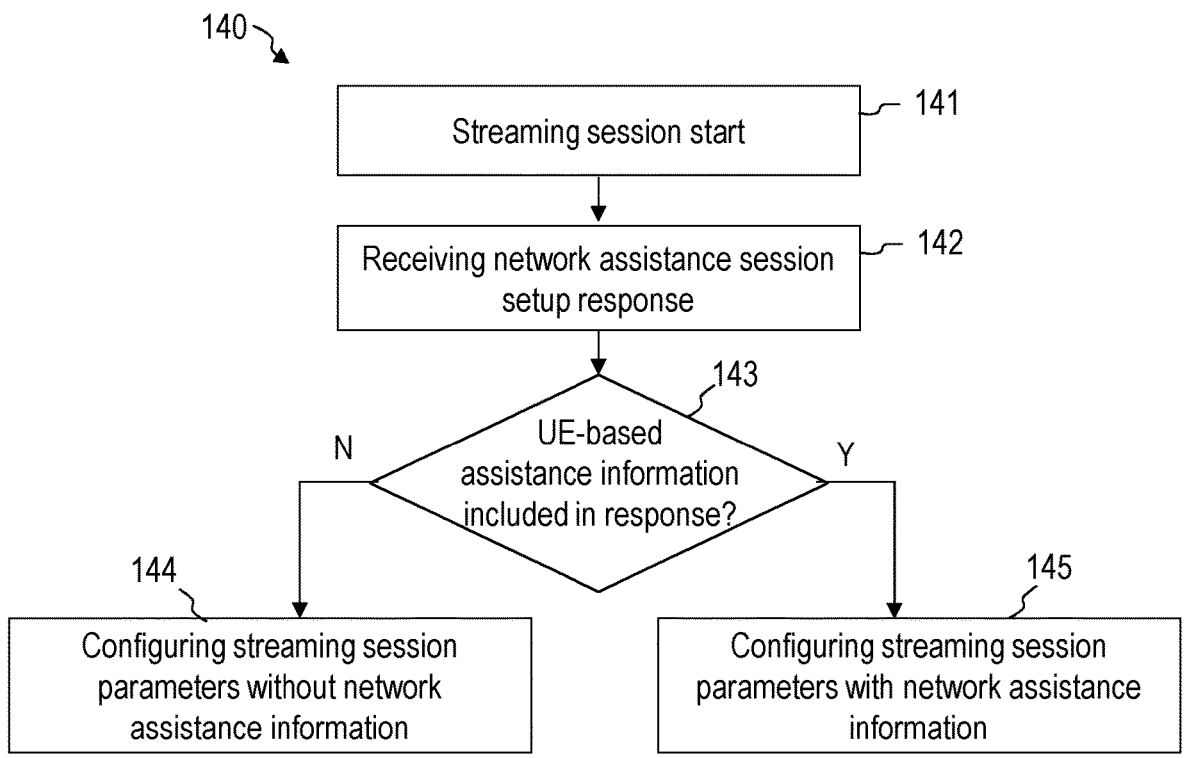
FIG. 15 is a flow chart of a method according to an embodiment.

FIG. 15 is a flow chart of a method 140. The method 140 may be performed by the user equipment 2. The method 140 may be performed at setup of a network assistance session.

At 141, a streaming session starts. A network assistance session setup is initiated, e.g. by the user equipment 2. The user equipment 2 may transmit the network assistance session setup message 81.

At 142, the user equipment 2 receives the network assistance session setup response message 82.

At 143, the user equipment 2 may determine whether the network assistance session setup response message 82 includes network assistance information.

At 144, if the network assistance session setup response message 82 does not include network assistance information, the user equipment 2 may configure streaming session parameters without network assistance.

At 145, if the network assistance session setup response message 82 includes network assistance information, the user equipment 2 may configure streaming session parameters based on the network assistance information. For illustration, segment lengths, timing parameters, buffer strategies, and/or media selection may be performed in dependence on the network assistance information.

Figure 16:
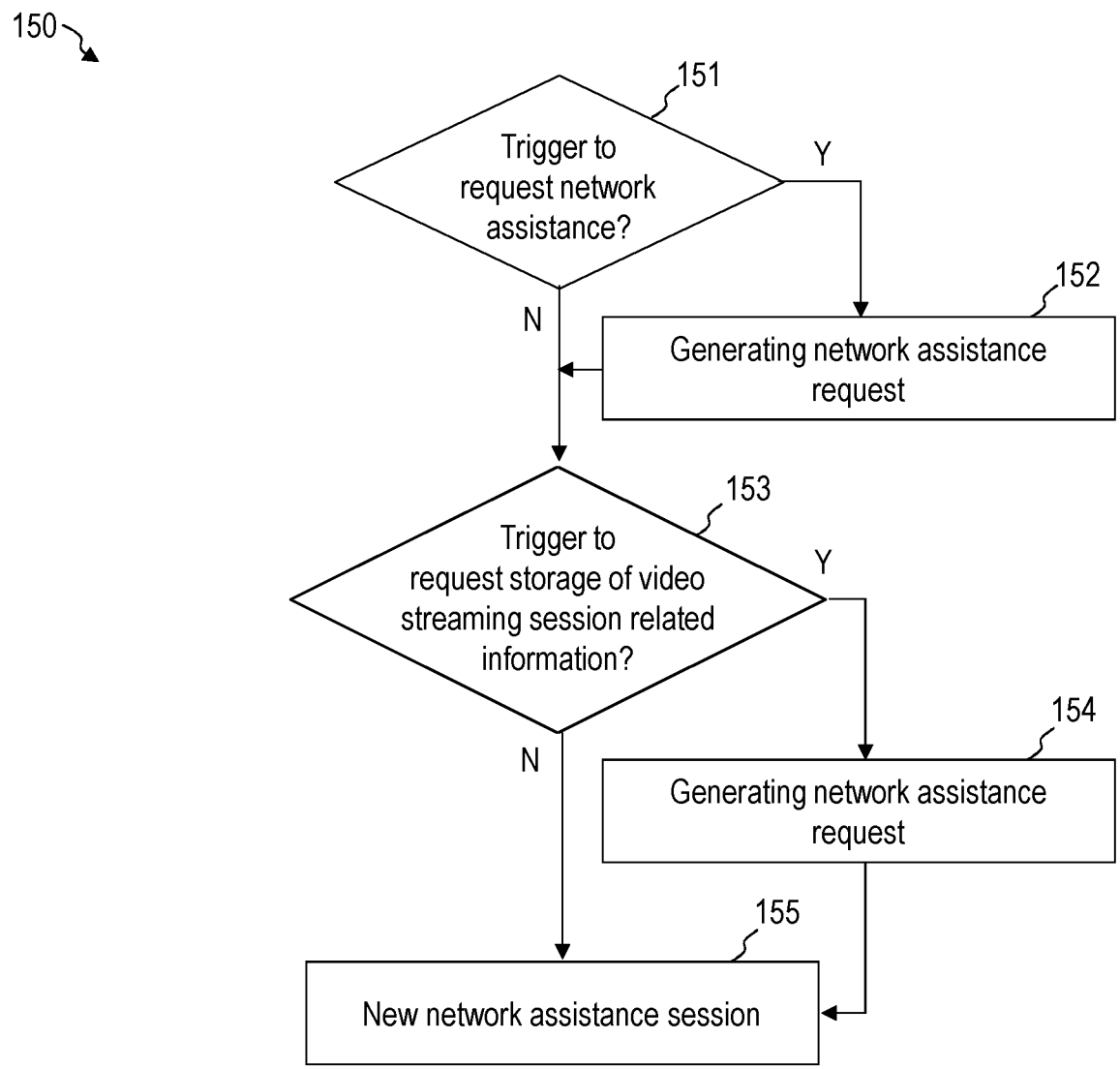
FIG. 16 is a flow chart of a method according to an embodiment.

FIG. 16 is a flow chart of a method 150. The method 150 may be performed by the user equipment 2. The method 150 may be performed after setup of a network assistance session. The various acts described with reference to FIG. 14 may be performed after steps 144, 145 of the method 140 of FIG. 15.

At 151, the user equipment may determine whether a first trigger event for requesting network assistance occurred. The first trigger event may be timeout of a first timer or irregular conditions during the media streaming.

At 152, if the first trigger event occurred, the user equipment may generate the network assistance request 83. The network assistance request 83 may include video streaming session related information. The network assistance request 83 may include a user equipment identifier, an identifier for the application which requests network assistance, an identifier for the video streaming session, or media description information.

At 153, the user equipment may determine whether a second trigger event for requesting storage of media streaming session related information occurred. The second trigger event may be timeout of a second timer or a user input or a request issued by a video streaming application executed on the user equipment.

At 154, if the second trigger event occurred, the user equipment may generate the network assistance storage request 85. The network assistance storage request 85 includes video streaming session related information. The network assistance storage request 85 may include a user equipment identifier, an identifier for the application which requests network assistance, an identifier for the video streaming session, or media description information. The video streaming session related information may indicate a maximum buffer level of the user equipment in the media streaming session. Alternatively or additionally, the video streaming session related information may indicate a minimum buffer level of the user equipment in the media streaming session. Alternatively or additionally, the video streaming session related information may indicate an average buffer level of the user equipment in the media streaming session. Alternatively or additionally, the video streaming session related information may indicate a time between user equipment initiated buffer refills. Alternatively or additionally, the video streaming session related information may indicate a number of segments per buffer refill. Alternatively or additionally, the video streaming session related information may indicate a number of buffer underruns. Alternatively or additionally, the video streaming session related information may indicate durations of each buffer underrun. Alternatively or additionally, the video streaming session related information may indicate a quality of experience indicator in the media streaming session.

At 155, a new network assistance session may be set up. This may be implemented by performing the method 140 described with reference to FIG. 15.

Various effects are attained by the devices, methods and systems according to embodiments. For illustration, network assistance may be provided to user equipments for use in adaptive streaming, with the provided network assistance being based on media streaming session related information previously reported by other user equipments or the same user equipment.

While exemplary embodiments have been described with reference to the drawings, modifications may be implemented in other embodiments. For illustration, the media streaming network assistance node 34 does not need to be integrated with the eNodeB, but may be provided in another node of the radio access network or even in the core network. The media streaming network assistance node 34 may be formed as a separate node having an information sharing connection to one or more radio access network nodes.

For further illustration, while the techniques disclosed herein allow network assistance to be provided to a user equipment over the air interface of a cellular communication network and/or allow media streaming session related information to be shared by the user equipment over the air interface of the cellular communication network, the network assistance and media streaming session related information may additionally or alternatively be transmitted over other radio interfaces, e.g. Wi-Fi.

For further illustration, while the techniques disclosed herein may be used in association with streaming media which includes video, the techniques may also be used for other media streaming, such as audio streaming.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

The invention claimed is:

1. A user equipment, comprising:
a wireless interface over which communication with a radio access network is made for a media streaming session between the user equipment and a media streaming server, wherein the media streaming session is an end-to-end connection between the user equipment and the media streaming server via the radio access network,
wherein, the user equipment receives, via the wireless interface, network assistance information from the radio access network for execution of the media streaming session, and
wherein the user equipment executes logic to:
generate media streaming session related information from characteristics monitored during the media streaming session;
transmit the media streaming session related information over the wireless interface to the radio access network for generation of the network assistance information by the radio access network; and
set a parameter for the media streaming session based on the network assistance information.

2. The user equipment of claim 1, wherein the user equipment generates a storage request including the media streaming session related information, the storage request causing storage of the media streaming session related information in a storage medium remote from the user equipment.

3. The user equipment of claim 2, wherein the storage request causes a cellular network node of the radio access network to store the media streaming session related information in the storage medium.

4. The user equipment of claim 1, wherein the user equipment generates the media streaming session related information based on time-dependent changes of a buffer level during buffering in the media streaming session.

5. The user equipment of claim 1, wherein the user equipment generates the media streaming session related information based on at least one of the following:
a maximum buffer level of the user equipment in the media streaming session;
a minimum buffer level of the user equipment in the media streaming session;
an average buffer level of the user equipment in the media streaming session;
a time between user equipment initiated buffer refills;
a number of segments per buffer refill;
a number of buffer underruns;
durations of each buffer underrun; and
a quality of experience indicator in the media streaming session.

6. The user equipment of claim 1, wherein the network assistance information received by the user equipment is further based on information associated with a previous media streaming session reported by the user equipment or information associated with the previous media streaming session reported by at least one further user equipment different from the user equipment.

7. The user equipment of claim 1, wherein the parameter set by the user equipment includes at least one parameter of a streaming algorithm executed by the user equipment during the media streaming session.

8. The user equipment of claim 1, wherein the parameter set by the user equipment includes at least a buffering parameter of a buffering performed in the media streaming session.

9. The user equipment of claim 6, wherein the parameter set by the user equipment includes an initial media quality of the media streaming session.

10. The user equipment of claim 1, wherein the user equipment transmits, via the wireless interface, a network assistance request to obtain network assistance based on information collected by a media streaming network assistance node from at least one further user equipment during previous media streaming sessions.

11. A media streaming network assistance node of a radio access network, comprising:
at least one processor, wherein the at least one processor generates network assistance information associated with a media streaming session between a user equipment and a media streaming server, the media streaming session being an end-to-end connection between the user equipment and the media streaming server conducted via the radio access network; and
an interface to receive media streaming session related information from the user equipment,
wherein the at least one processor uses the media streaming session related information received from the user equipment to provide network assistance information for media streaming to the user equipment, and
wherein the network assistance information assists the user equipment to set a parameter for the media streaming session.

12. The media streaming network assistance node of claim 11, wherein the at least one processor derives statistical information from the media streaming session related information of the user equipment and further media streaming session related information received from a plurality of further user equipments.

13. The media streaming network assistance node of claim 11, wherein the media streaming session related information includes information on a time-dependent change of a buffer level in buffering performed by the user equipment during the media streaming session.

14. The media streaming network assistance node of claim 11, wherein the network assistance information affects at least one of:
a buffering procedure performed by the user equipment in the media streaming session; or
an initial media quality selection of the user equipment in the media streaming session.

15. The media streaming network assistance node of claim 11, wherein the media streaming network assistance node is a base station of a cellular communication network, or wherein the media streaming network assistance node is coupled to a base station of the cellular communication network.

16. The media streaming network assistance node of claim 11, wherein the at least one processor generates the network assistance information by means of mobile-edge-computing (MEC).

17. A media streaming method, comprising:
requesting, by a user equipment, network assistance for a media streaming session;
receiving, by the user equipment, network assistance information;
setting, by the user equipment, at least one parameter for execution of the media streaming session as a function of the received network assistance information;

generating, by the user equipment, media streaming session related information from characteristics monitored during the media streaming session; and transmitting, by the user equipment, the media streaming session related information over the wireless interface to a radio access network for storage.

18. The media streaming method of claim 17, the media streaming session related information being based on at least one of the following:

a maximum buffer level of the user equipment in the media streaming session;

a minimum buffer level of the user equipment in the media streaming session;

an average buffer level of the user equipment in the media streaming session;

a time between user equipment initiated buffer refills;

a number of segments per buffer refill;

a number of buffer underruns;

durations of each buffer underrun; and a quality of experience indicator in the media streaming session.

19. The media streaming method of claim 17, further comprising:

using, by a media streaming network assistance node of the radio access network, the media streaming session related information to provide network assistance to the user equipment and/or to at least one further user equipment different from the user equipment.

20. The media streaming method of claim 17, wherein the network assistance information assists the user equipment in selecting at least one parameter of a buffering procedure and/or an initial media quality.

* * * * *